United States Patent [19]

Pringle

[11] Patent Number: 4,524,501
[45] Date of Patent: Jun. 25, 1985

[54] APPARATUS FOR JOINING FLARED ENDED TUBES

[75] Inventor: William L. Pringle, Grosse Pointe Shores, Mich.

[73] Assignee: United States Steel Corporation, Pittsburgh, Pa.

[21] Appl. No.: 363,958

[22] Filed: Mar. 31, 1982

[51] Int. Cl.³ ............................................. B23P 19/04
[52] U.S. Cl. ........................................ 29/237; 29/252
[58] Field of Search ................ 29/237, 238, 262, 282, 29/252

[56] References Cited

U.S. PATENT DOCUMENTS

| | | | |
|---|---|---|---|
| 3,426,417 | 2/1969 | Austin | 29/237 |
| 3,653,115 | 4/1972 | Perkins | 29/282 |
| 3,727,289 | 4/1973 | Bemelmann et al. | 29/237 |
| 3,777,354 | 12/1973 | Masters | 29/237 |
| 4,189,817 | 2/1980 | Moebius | 29/237 |
| 4,418,458 | 12/1983 | Hunter | 29/237 |

FOREIGN PATENT DOCUMENTS 142729 9/1982 Japan .................................... 29/237

Primary Examiner—James L. Jones, Jr.
Attorney, Agent, or Firm—Reising, Ethington, Barnard Perry & Milton

[57] ABSTRACT

A tube construction includes first and second tube members 16, 24, each of the tube members 16, 24 having a flared end portion 96. A joint for connecting the tube member 16, 24 together includes an annular resilient seal 98 having a pair of side faces 100. Each of the side faces 100 includes an outwardly tapering flat portion 101 and integral intermediate portion 103 as viewed in cross section. The joint further includes an annular ferrule 18 having a pair of inwardly sloping annular portions 26, 102 and an annular central portion 104 interconnecting the inwardly sloping annular portions 26, 102. Each of the inwardly sloping annular portions 26, 102 engages the flared end portions 96 so that the flared end portions 96 are clamped between the inwardly sloping annular portions 26, 102 and against the side faces 100 with the intermediate portion 101 of the seal 98 clamped between the open ends of the flared end portions 96 to perfect a seal between the two tube members 16, 24.

An apparatus 10 for joining the tube members 16, 24 together includes a first tube support 12 having a pocket 14 for receiving the first tube 16 with the ferrule 18 disposed thereon and a second tube support 20 having a pocket 22 for receiving the second tube support 24. A hydraulic actuator moves the first and second tube supports 12, 20 between an open position for receiving the first and second tubes 16, 24 in the pockets 14, 22 and a closed position to crimp the cylindrical portion 28 of the ferrule 18 over the outside of the flared end 96 of the second tube 24. The apparatus is characterized by at least one of the first and second tube supports 12, 20 including a pair of arms 28, 30, 32, 34 pivotally connected together along the respective lengths for scissor-like movement between a receiving position opening the pockets 14, 22 therein and a retaining position closing the pockets 14, 22 therein.

20 Claims, 11 Drawing Figures

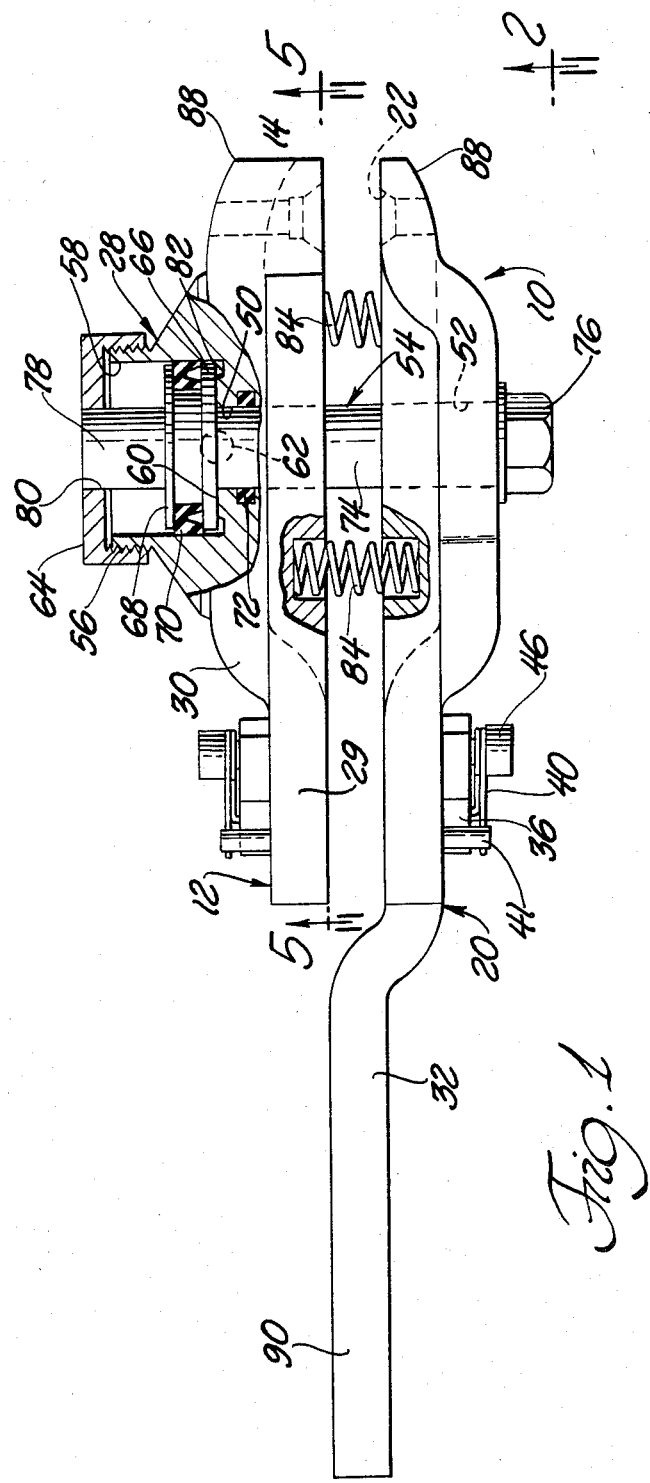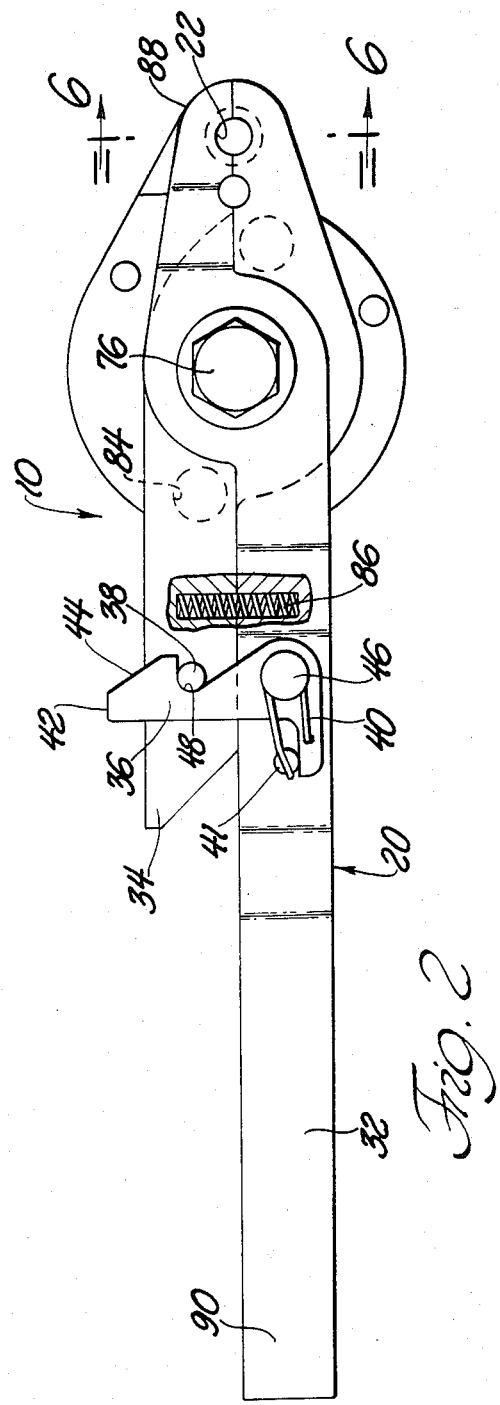

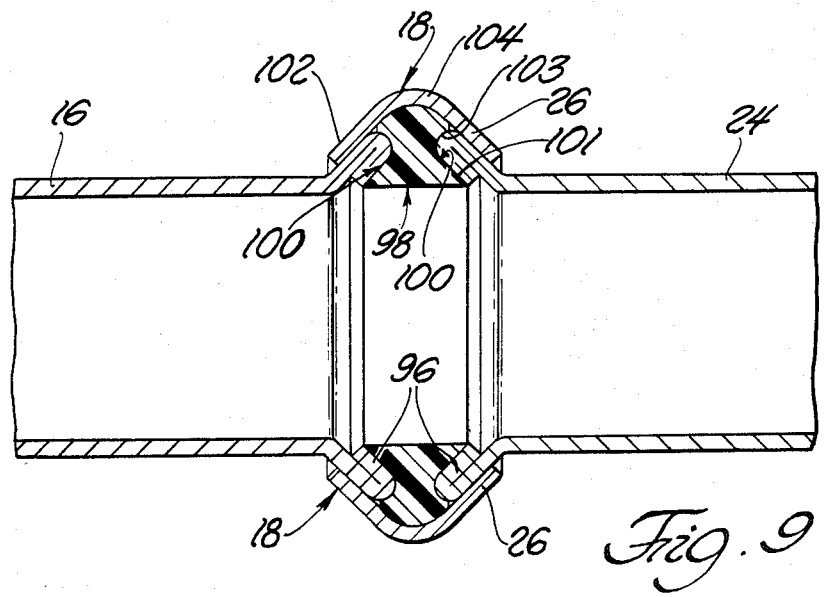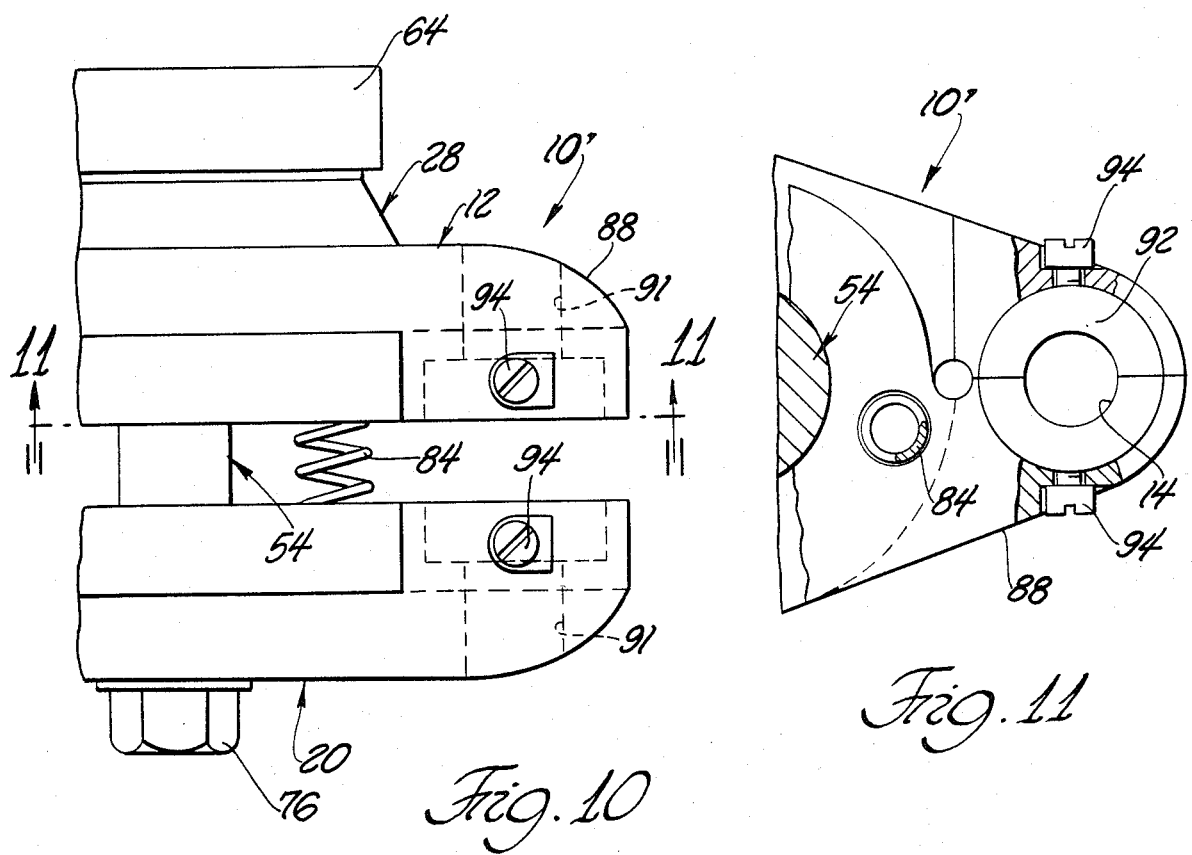

4,524,501

APPARATUS FOR JOINING FLARED ENDED TUBES

TECHNICAL FIELD

This invention relates to a tool and method for crimping a joint about the ends of two tube members to join the tube members together. The instant invention further relates to a novel joint, formed by the aforementioned tool for joining together the flared end portion of two tube members and forming a seal therebetween.

BACKGROUND ART

The art of joints for connecting two tube members together and the apparatus for crimping such joints is well developed. For example, the U.S. Pat. No. 4,189,817 to Moebius teaches a hydraulic assembly for securing two tube members together. The assembly includes a hydraulic cylinder for actuating movement of a first jaw member against an immovable second jaw member. Each jaw member includes a notch portion for engaging the tube fitting. The U.S. Pat. No. 3,777,354 to Masters teaches a hose mending apparatus which crimps the cylindrical end portion of a fitting about the ends of two hose members. The end portions of the fitting are crimped within a frustoconical inner surface of a die member of the mending apparatus. Neither patent discloses an effective means for retaining the tube members within the mending apparatus during the crimping of the joint. Furthermore, neither patent discloses a simple and effective means for crimping a ferrule about the flared end portion of a tube to form a joint binding the tubes together. Finally, neither patent discloses an effective joint which joins two tube members together to form a seal between the tubes for withstanding the forces exerted by pressurized fluid passing through the tubes and across the joint.

STATEMENT OF THE INVENTION

According to the present invention, there is provided a joint for connecting together a pair of tube members, each of the tube members having a flared end portion. The joint includes an annular resilient seal having a pair of side faces and characterized by including an outwardly tapering flat portion, as viewed in cross section and an integral intermediate portion as viewed in cross section. An annular ferrule has a pair of inwardly sloping annular portions and an annular central portion interconnecting the inwardly sloping annular portions. The inwardly sloping annular portions are adapted to engage the flared end portions of the tube members to clamp the end portions therebetween and against the side faces of the seal with the intermediate portion of the seal clamped between the open ends of the flared end portions to form a seal between the tube members.

The present invention further provides an apparatus for forming the aforementioned joint. The apparatus includes a first tube support having a pocket for receiving the first tube with the ferrule disposed thereon and a second tube support having a pocket for receiving the second tube. An actuator mechanism moves the first and second tube supports between an open position for receiving the first and second tubes in the pockets in a closed position to crimp the cylindrical portion of the ferrule over the outside of the flared end of the second tube. The invention is characterized by one of the first and second tube supports being defined by a pair of arms pivotally connected together along their respective lengths for scissor-like movement between a receiving position opening the pocket therein and a retaining position closing the pocket therein. The apparatus is further characterized by the actuator mechanism including a cylindrical flange extending outwardly from one of the tube supports and defining a cup-shaped interior surface having side walls and a base. The base includes at least one port for allowing hydraulic fluid therethrough. The hydraulic cylinder further includes a cap member reversibly fastened to the open end of the cylindrical flange. An axle member includes a radially outwardly extending flange disposed within the cup-shaped interior to define a piston. The piston is adjacent the base when the tube support is in an open position and the piston is adjacent the cap member when the tube support is in the closed position wherein the ferrule is crimped about the flared end portions of the tube members.

FIGURES IN THE DRAWING

Other advantages of the present invention will be readily appreciated as the same becomes better understood by reference to the following detailed description when considered in connection with the accompanying drawing wherein:

FIG. 1 is a plan view partially broken away and in cross section of a crimping tool and in an open position.

FIG. 2 is a side elevational view partially broken away of the crimping tool in a retaining position and taken substantially along lines 2—2 of FIG. 1;

FIG. 9 is an enlarged cross-sectional view of a pair of tube members connected together by a joint constructed in accordance with the instant invention;

FIG. 10 is a fragmentary plan view of a second embodiment of a joint crimping tool constructed in accordance with the instant invention; and FIG. 11 is a cross-sectional view partially broken away and in cross section and taken substantially along lines 11—11 of FIG. 10.

DETAILED DESCRIPTION OF THE DRAWING

Figure 3:
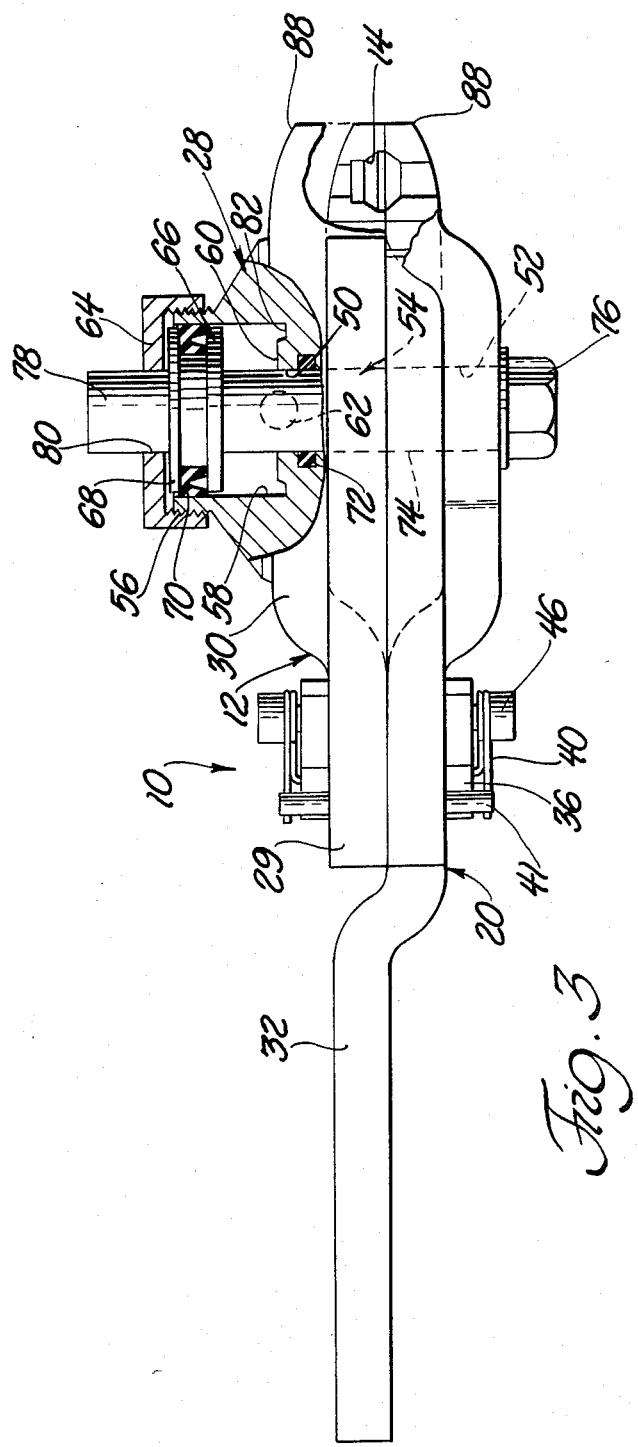
FIG. 3 is a plan view partially broken away and in cross section of the subject crimping tool in a closed position.

Referring to the drawings, an apparatus constructed in accordance with the instant invention is generally shown at 10 in FIGS. 1-8.

The apparatus 10 includes first tube support means, generally indicated at 12, having a pocket 14 for receiving a first tube 16 having a ferrule 18 disposed thereon. The apparatus 10 further includes second tube support means, generally indicated at 20. The second tube support means 20 includes a pocket 22 for receiving a second tube 24. The flared end portion of each tube 16 and 24 is seated within the frustoconical portion of each respective pocket 14 and 16. The pocket 22 is slightly larger than the outer diameter of the flared end portion of the tube 24 for receiving the cylindrical end portion 26 of the ferrule 18, as will be described in more detail below.

Figure 6:
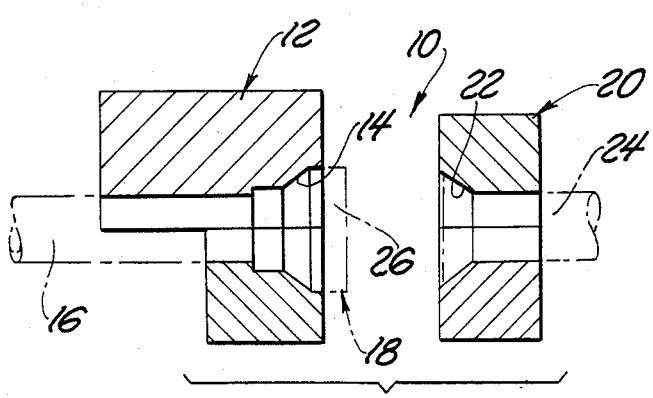
FIG. 6 is an enlarged cross-sectional view taken substantially along lines 6—6 of FIG. 2.
Figure 7:
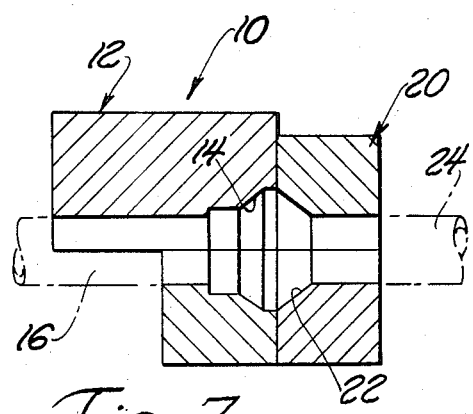
FIG. 7 is a cross-sectional view of the pockets of the tube supports in the closed position.
Figure 8:
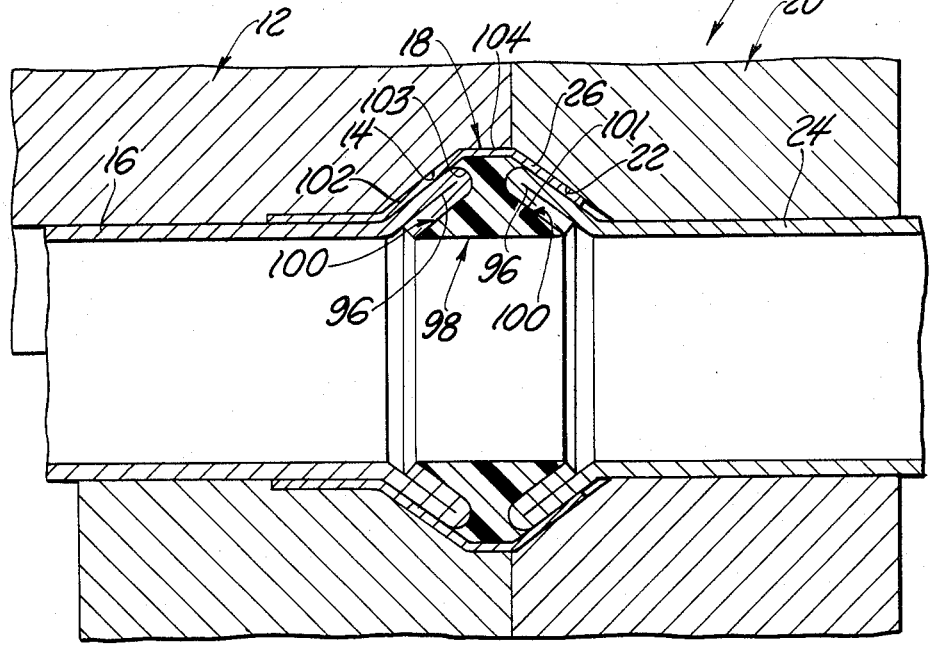
FIG. 8 is an enlarged cross-sectional view of a joint constructed in accordance with the instant invention formed within the pockets of the subject crimping tool.

The apparatus 10 further includes actuator means, generally indicated at 28 in FIGS. 1 and 3 for moving the first and second tube support means 12 and 20 between an open position, as shown in FIGS. 1 and 6, for receiving the first and second tubes 16 and 24 in the pockets 14 and 22 and a closed position, as shown in FIGS. 3, 7 and 8 to crimp the cylindrical portion 26 of the ferrule 18 over the outside of the flared end of the second tube 24. In other words, the actuator means forces the first tube support to move from an open position wherein the pocket 14 is spaced from the pocket 22 to a closed position wherein the pocket 14 is brought to a position adjacent the pocket 22. In doing so, the cylindrical portion 26 of the ferrule 18 is forced into the space between the flared end portion of the tube 24 and the inner surface of the pocket 22. Accordingly, the cylindrical portion of the ferrule 18 is crimped about the outer surface of the flared end portion of the tube 24, as shown in FIGS. 7 and 8.

Figure 4:
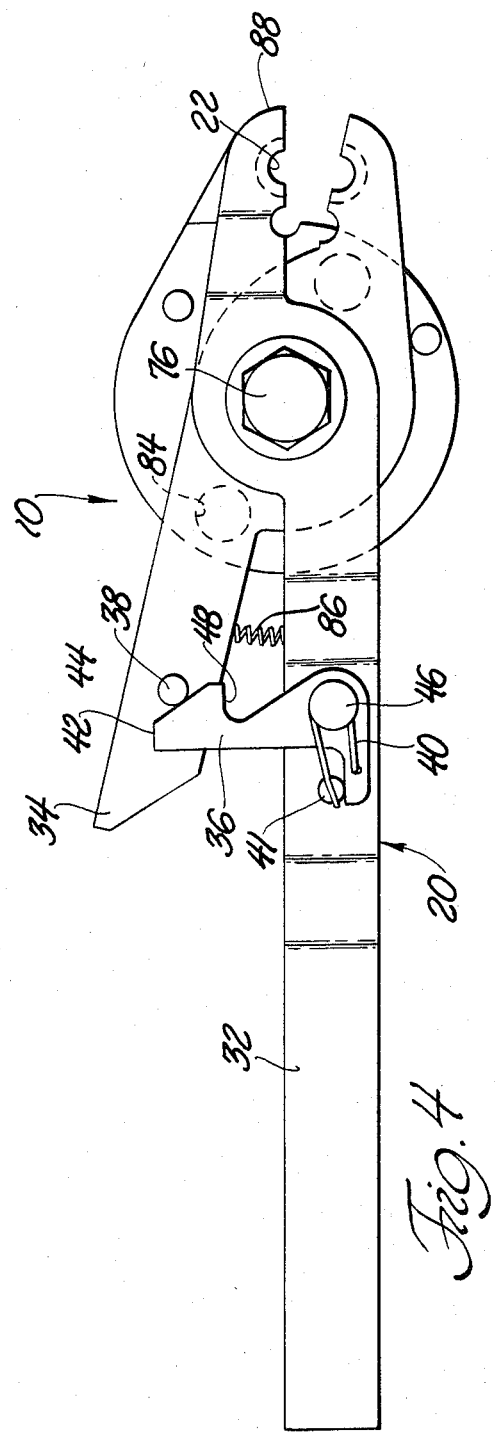
FIG. 4 is a side elevational view of the subject crimping tool in the receiving position.
Figure 5:
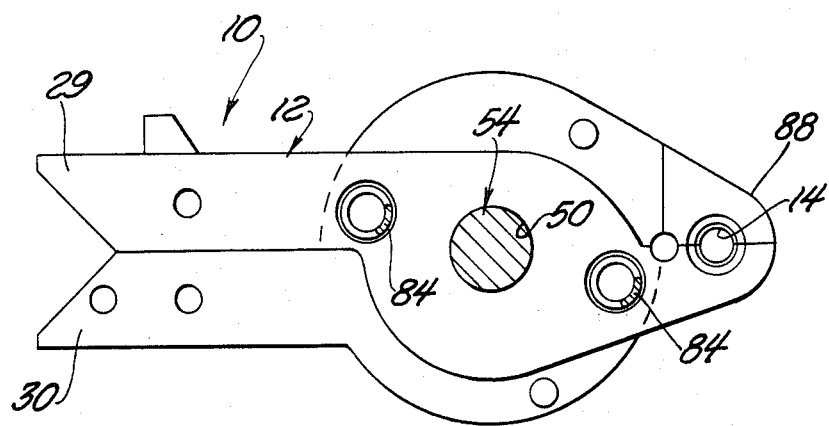
FIG. 5 is a cross-sectional view taken substantially along lines 5—5 of FIG. 1.

The assembly 10 is characterized by at least one of the tube support means 12 or 20 being defined by a pair of arms pivotally connected together along the irrespective lengths for scissor-like movement between a receiving position opening the pocket 14, 22 therein, as shown in FIG. 4, and a retaining position closing the pocket 14, 22 therein, as shown in FIGS. 2 and 5.

More specifically, the first tube support means 12 includes first and second arms 29 and 30, as shown in FIG. 5. The second tube support means 20 includes a second pair of arms 32 and 34. When the arms 32 and 34 of the second tube support means 20 is in the receiving position, as shown in FIG. 4, the tube member 24 can be inserted in the pocket 22. The arms 32 and 34 are moved to the retaining position, as shown in FIGS. 2 and 5, wherein the tube 24 is effectively secured and retained within the pocket 22. The arms 28 and 30 of the first tube support means 12 function in a similar manner to retain the tube 16 and ferrule 18 within the pocket 14. Once the tubes are retained within the respective pockets 14 and 22, the actuator means 28 is actuated to move the tube support means 12 and 20 from the open position to the closed position, thereby forming the joint about the tube members 16 and 24. Once the joint is formed, the actuator means 28 moves the tube support means 12 and 14 to the open position and the arms thereof are moved to the receiving position to release the tubes 16 and 24 and the formed joint. Thusly, the instant invention provides an effective means for securely retaining the tube members 16 and 24 and ferrule 18 within the tool 10 for effectively forming a joint therebetween.

The assembly 10 further includes locking means for locking each pair of arms 29, 30 and 32, 34 in the retaining position. The locking means includes a hook member 36 mounted for pivotal movement on one of each pair of arms 30, 32 and a pin 38 projecting from the other one of each pair of said arms 29 and 34. Each hook member 36 removably engages the pin 38 for locking each pair of arms 29, 30, and 32, 34 in the retaining position. A wire spring 40 biases the hook member 36 towards engagement with the pin 38. In operation, the hook member 36 is disengaged from the pin 38 to allow movement of arms 34 and 29 to the receiving position. Once a tube is inserted into a pocket 14 or 22, the arms 29 and 34 are moved in a scissor-like fashion to the retaining position and the hook member 36 is brought into engagement with the pin 38 thereby locking the arms 29 and 30, and 32 and 34 into the retaining position. The hook 36 includes a head portion 42 having an angled surface 44 which engages the pin 38 when the arms 29, 30 and 32, 34 are in the receiving position, as shown in FIG. 4. When the arms 29, 30, 32, 34 are moved to the retaining position, the pin 38 slides along the angled surface 44 of the hook member 36 thereby moving the hook member 36 against the biasing pressure of the wire spring 40. The hook member 36 pivots about a mounting pin 46 until the pin 38 is brought into engagement with the hook-shaped portion 48 of the hook member 36. In the retaining position, the pin 38 is retained within the hook-shaped portion 48 of the hook member 36.

Each of the first and second tube support means 12 and 20 include an opening 50 and 52 therethrough, respectively, as shown in FIGS. 1 and 3. In other words, each of the arm members 29, 30, and 32, 34 have an opening 50, 52 therethrough. The subject apparatus 10 includes an axle member generally shown at 54 extending through the openings 50, 52. The actuator means 28 moves the first and second tube support means 12 and 20 axially along the axle member 54 between the open and closed positions. Additionally, each pair of arms 29, 30 and 32, 34 are mounted on the axle member 54 for pivotal scissor-like movement thereon. In other words, the axle 54 performs at least two functions. The axle member 54 provides a track along which each pair of arms 29, 30, and 32, 34 moves along between the open and closed positions and, additionally, the axle member 54 provides a pivot axis about which each pair of arms 29, 30, and 32, 34 pivot between the receiving and retaining positions.

The actuator means 28 includes a hydraulic cylinder extending outwardly and integral with the arm member 30. The hydraulic cylinder includes a cylindrical flange 56 extending outwardly from the arm 30 and defining a cupshaped interior surface having side walls 58 and a base portion 60. The base portion 60 includes a port 62 for allowing hydraulic fluid to enter into the hydraulic cylinder. The hydraulic cylinder further includes a cap member 64 threadedly engaging and reversibly fastened to the open end of the cylindrical flange 56. In other words, the cap member 64, side walls 58 and base 60 form a hydraulic cylinder integral with the arm 30. The axle member 54 includes a radially outwardly extending first flange 66 disposed within the cup-shaped interior of the hydraulic cylinder to define a piston. The axle member 54 further includes a second annular flange 68 extending radially therefrom and spaced from the first flange 66.

An annular resilient gasket 70 is disposed about the axle member 54 and between the first and second flanges 66, 68. The gasket 70 is U-shaped when viewed in cross section. The hydraulic cylinder further includes a seal 72 for perfecting a seal between the arm 30 and the axle member 54.

The axle member 54 includes a first cylindrical portion 74 extending from the first flange 66 and through the openings 50 and 52 of the tube support means 12 and 20. The tube support means 12 and 20 are mounted upon the first cylindrical portion 74. A nut member engages a threaded end of the first cylindrical portion 74 to secure the tube support means 12 and 20 upon the first cylindrical portion 74 of the axle member 54. The axle member 54 further includes a second cylindrical portion 78 extending from the second flange 68. The cap member 64 includes a cap opening 80 therethrough. The second cylindrical portion 78 is disposed within the cap opening 80 and is axially movable therethrough.

In operation, hydraulic fluid entering through the port 62 enters the space 82 between the first flange 66 and the base 60. The space 82 prevents the first flange 66 from bottoming out upon the base 60. The force of the hydraulic fluid moves the first tube support means 12 from the open to the closed positions by axially moving the first tube support means 12 along the axle member 54. When the tube support means 12 and 20 are in the closed position, the second flange 68 is adjacent to cap member 64 as shown in FIG. 3. As the first tube support means 12 is actuated to the closed position, the second cylindrical portion 78 of the axle member 54 moves axially through the cap opening 80 of the cap member 64. The U-shaped seal 70 expands in response to the pressure of the entering hydraulic fluid to perfect a seal about the first and second flanges 66 and 68, thereby perfecting a seal between the axle member 54 and the side walls 58 of the actuator means 28.

The apparatus 10 further includes a pair of springs 84 disposed between the first and second tube support means 12 and 20 for biasing the tube support means 12 and 20 towards the open position. The apparatus 10 further includes springs 86 disposed between each pair of arms 29, 30, and 32, 34 for biasing the arms 29, 30 and 32, 34 towards the receiving position.

Each of the arms 29, 30, 32 and 34 includes a head portion 88. At least one arm 32 includes a handle portion 90. In the embodiments shown in FIGS. 1-5, the pockets 14 and 22 are formed within the head portions 88.

An alternative embodiment of the instant invention is generally shown at 10' in FIGS. 10 and 11. Like numbers designate like parts between the different embodiments. The head portion 88 includes seats 91. Insert members 92 are secured by set screws 94 within seats 91. Accordingly, a plurality of various insert members 92 having different predetermined sized pockets can be used so that a single tool constructed in accordance with the instant invention can be used to form joints between tubes having various sizes and for various sized ferrules.

The instant invention further provides a novel joint for connecting the pair of tube members 16 and 24 together. Each of the tube members 16, 24 has a flared end portion 96.

The joint includes an annular resilient seal or gasket generally indicated at 98, having a pair of side faces generally shown at 100. The gasket 98 is characterized by including an outwardly tapering flat portion 101 and a substantially curved or annular intermediate portion 103, as viewed in cross section. The joint further includes an annular ferrule, generally indicated at 18, having a pair of inwardly sloping annular portions 26 and 102 and an annular central portion 104. The central portion 104 interconnects the inwardly sloping annular portions 26 and 102. The inwardly sloping annular portions 26 and 102 are adapted to engage the flared end portions 96 of the tube members 16 and 24 to clamp the flared end portions 96 therebetween and against the side faces 100 of the gasket 98. The intermediate portion 103, of the gasket 98 is clamped between the open ends of the flared end portions 96 to form a seal between the tube members 16 and 24. The central portion of the ferrule engages the exposed portion of the gasket 98 between the flared end portions 96. In other words, the flared end portions 96 of the tube members 16 and 24 are clamped between the ferrule 18 and the gasket 98. The force of the inwardly sloping annular portions 26 and 102 against the outer surfaces of the flared end portions 96 force the inner surfaces of the flared end portions 96 against the side face 100 of the gasket 98. Accordingly, the intermediate portions 103 and tapered side faces 101 of the gasket 98 are clamped tightly between the open ends of the flared end portions 96. A strong seal is perfected whereby a joint constructed in accordance with the instant invention can withstand high pressures of fluids passing through the tubes 16 and 24 and across the joint.

The flared end portions 96 are U-shaped as viewed in cross section to provide structural reinforcement to the tube members 16, 24 about the joint. Alternatively, the second tube member 24 may have a closed end opposite the flared end portion 96 thereof for providing a cap at the end of a tube 16. In other words, the instant invention may be used to connect a cap to the other end of a tube member and perfect a seal thereabout.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

The embodiments of the invention in which an exclusive property or privilege is claimed are defined as follows:

1. An apparatus (10) for joining two tubes (16,24), each having flared ends (96) with a first of the tubes (16) having a ferrule (18) with a frustoconical portion (102) engaging the outside of the flared end (96) thereof and a cylindrical portion (26) extending therefrom to be crimped over the outside of the flared end of the second tube (24), said apparatus (10) comprising; first tube support means (12) having a pocket (14) for receiving the first tube (16) with the ferrule (18) disposed thereon, second tube support means (20) having a pocket (22) for receiving the second tube (24), actuator means (28) for moving said first and second tube support means (12,20) between an open position for receiving the first and second tubes (16,24) in said pockets (14,22) and a closed position to crimp the cylindrical portion (28) of the ferrule (18) over the outside of the flared end (96) of the second tube (24), and at least one of said first and second tube support means (12,20) being defined by a pair of arms (29,30,32,34) pivotally connected together along their respective lengths for scissor-like movement between a receiving position opening said pocket (14,22) therein and a retaining position closing said pocket (14,22) therein, said assembly including locking means for locking said arms (29,30,32,34) in said retaining position, said locking means including a hook member (36) mounted for pivotal movement on one side of said arms (30,32) and a pin (38) projecting from the other of said arms (29,34), said hook member (36) removably engaging said pin (38) for locking said arms (29,30,32,34) in said retaining position.

2. An apparatus (10) for joining two tubes (16,24), each having flared ends (96) with a first of the tubes (16)

having a ferrule (18) with a frustoconical portion (102) engaging the outside of the flared end (96) thereof and a cylindrical portion (26) extending therefrom to be crimped over the outside of the flared end of the second tube (24), said apparatus (10) comprising; first tube support means (12) having a pocket (14) for receiving the first tube (16) with the ferrule (18) disposed thereon, second tube support means (20) having a pocket (22) for receiving the second tube (24), actuator means (28) for moving said first and second tube support means (12,20) between an open position for receiving the first and second tubes (16,24) in said pockets (14,22) and a closed position to crimp the cylindrical portion (28) of the ferrule (18) over the outside of the flared end (96) of the second tube (24), and at least one of said first and second tube support means (12,20) being defined by a pair of arms (29,30,32,34) pivotally connected together along their respective lengths for scissor-like movement between a receiving position opening said pocket (14,22) therein and a retaining position closing said pocket (14,22) therein, said assembly including locking means for locking said arms (29,30,32,34) in said retaining position, said first and second tube support means (12,20) including an opening (50,52) therethrough, said apparatus (10) including an axle member (54) extending through said opening (50,52), said actuator means (28) moving said first and second tube support means (12,20) axially along said axle member (54) and said pair of arms (29,30,32,34) being mounted on said axle member (54) for pivotal movement thereon.

3. An apparatus as set forth in claim 2 further characterized by said actuator means (28) including a hydraulic cylinder extending outwardly from and integral with one of said tube support means (12).

4. An apparatus as set forth in claim 3 further characterized by said hydraulic cylinder including a cylindrical flange (56) extending outwardly from one of said tube support means (12) and defining a cup-shaped interior surface having side walls (58) and a base (60), said base (60) including at least one port (62) for allowing hydraulic fluid therethrough, said hydraulic cylinder further including a cap member (64) reversibly fastened to the open end of said cylindrical flange (56), said axle member (54) including a radially outwardly extending first flange (66) disposed within said cup-shaped interior to define a piston, said piston being adjacent said base (60) when said tube support means (12, 20) are in said open position, said piston being adjacent said cap member (64) when said tube support means (12, 20) are in said closed position.

5. An apparatus as set forth in claim 4 further characterized by said hydraulic cylinder including sealing means (72) for perfecting a seal between said tube support means (12) and said axle member (54).

6. An apparatus as set forth in claim 5 further characterized by said axle member (54) including a second annular flange (68) extending radially therefrom and spaced from said first flange (66), said sealing means including an annular resilient gasket (70) which is U-shaped when viewed in cross section, said gasket (70) being disposed about said axle member (54) and between said first and second flanges (66, 68).

7. An apparatus as set forth in claim 6 further characterized by said axle member (54) including a first cylindrical portion (74) extending from said first flange (66) through said openings (50, 52) of said tube support means (12, 20) and a second cylindrical portion (78) extending from said second flange (68), said cap member (64) including cap opening (80) therethrough and said second cylindrical portion (78) being disposed within said cap opening (80) and axially movable therethrough.

8. An apparatus as set forth in claim 7 further characterized by said apparatus (10) including first biasing means (84) for biasing said tube support means (12, 20) towards said open position.

9. An apparatus as set forth in claim 7 further characterized by said apparatus (10) including second biasing means (86) for biasing said pair of arms (29, 30, 32, 34) towards said receiving position.

10. An apparatus as set forth in claim 7 further characterized by each of said tube support means (12, 20) including a head portion (88) and at least one of said tube support means (12, 20) including a handle portion (90), said head portion (88) including seating means (91) and an insert member (92) removably secured within said seating means (91), said insert member (92) including said pocket (14).

11. An apparatus as set forth in claim 10 further characterized by both of said tube support means (12, 20) being defined by a pair of arms (29, 30, 32, 34) pivotally connected together along their respective lengths for scissor-like movement between said receiving position and said retaining position.

12. An apparatus as set forth in claim 2 further characterized by each of said tube support means including a head portion (88) and at least one of said tube support means (12, 20) including a handle portion (90), said head portion (88) including seating means (90) and an insert member (92) removably secured within said seating means (90), said insert member (92) including said pocket (14).

13. An apparatus as set forth in claim 12 further characterized by both of said tube support means (12, 20) being defined by a pair of arms (29, 30, 32, 34) pivotally connected together along their respective lengths for scissor-like movement between said receiving position and said retaining position.

14. An apparatus as set forth in claim 2 further characterized by both of said tube support means (12, 20) being defined by a pair of arms (29, 30, 32, 34) pivotally connected together along their respective lengths for scissor-like movement between said receiving position and said retaining position.

15. An apparatus (10) for joining two tubes (18, 24) each having flared ends with a first of the tubes (18) having a ferrule (26) with a conical portion engaging the article of the flared end thereof and a cylindrical portion (26) extending therefrom to be crimped over the outside of the flared end of the second tube (24), said apparatus (10) comprising; first tube support means (12) having a pocket (14) for receiving the first tube (16) with the ferrule (26) disposed thereon and a first opening (50) therethrough, second tube support means (20) having a pocket (22) for receiving the second tube (24) and having a second opening (52) therethrough, an axle member (54) extending through said first and second openings (50, 52), and actuator means (28) for moving said first and second tube support means (12, 20) axially along said axle member (54) between an open position for receiving the first and second tube (16, 24) in said pockets (14, 22) and a closed position to crimp the cylindrical portion (26) of the ferrule (18) over the outside of the flared portion of the second tube (24), and characterized by said actuator means (28) including a cylindrical flange (56) extending outwardly from one of said tube support means (12) and defining a cup-shaped interior surface having side walls (58) and a base (60), said base (60) including at least one port (62) for allowing hydraulic fluid therethrough, said hydraulic cylinder further including a cap member (64) reversible fastened to the open end of said cylindrical flange (56), said axle member (54) including a radially outwardly extending first flange (66) disposed within said cup-shaped interior to define a piston, said piston being adjacent said base (60) when said tube support means (12, 20) are in said open position and adjacent said cap member (64) when said tube support means (12, 20) are in said closed position.

16. An apparatus as set forth in claim 15 further characterized by said hydraulic cylinder including sealing means (72) for perfecting a seal between said tube support means (12) and said axle member (54).

17. An apparatus as set forth in claim 16 further characterized by said axle member (54) including a second annular flange (68) extending radially outwardly therefrom and spaced from said first flange (66), said sealing means including an annular resilient gasket (70) which is U-shaped when viewed in cross section, said gasket (70) being disposed about said axle member (54) and between said first and second flanges (66, 68).

18. An apparatus as set forth in claim 17 further characterized by said axle member (54) including a first cylindrical portion (74) extending from said first flange (66) through said openings (50, 52) of said tube support means (12, 20) and a second cylindrical portion (78) extending from said second flange (68), said cap member (64) including cap opening (80) therethrough and said second cylindrical portion (78) being disposed within said cap opening (80) and axially movable therethrough.

19. An apparatus as set forth in claim 18 further characterized by said apparatus (10) including first biasing means (84) for biasing said tube support means (12, 20) towards said open position.

20. An apparatus as set forth in claim 19 further characterized by said apparatus (10) including biasing means (86) for biasing said pair of arms (29, 30, 32, 34) towards said receiving position.

* * * * *